United States Patent [19]

Olnowich

[11] Patent Number: 4,701,842

[45] Date of Patent: Oct. 20, 1987

[54] METHOD AND APPARATUS FOR AVOIDING EXCESSIVE DELAY IN A PIPELINED PROCESSOR DURING THE EXECUTION OF A MICROBRANCH INSTRUCTION

[75] Inventor: Howard T. Olnowich, Endwell, N.Y.

[73] Assignee: International Business Machines Corporation, Armonk, N.Y.

[21] Appl. No.: 784,073

[22] Filed: Oct. 4, 1985

[51] Int. Cl.$^4$ .............................................. G06F 9/22
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,099,229 | 7/1978 | Kancler | 364/200 |
| 4,128,873 | 12/1978 | Lamiaux | 364/200 |
| 4,373,180 | 2/1983 | Linde | 364/200 |
| 4,390,946 | 6/1983 | Lane | 364/200 |
| 4,415,969 | 11/1983 | Bayliss et al. | 364/200 |
| 4,507,732 | 3/1985 | Catiller et al. | 364/200 |

Primary Examiner—David Y. Eng
Attorney, Agent, or Firm—John H. Bouchard

[57] ABSTRACT

In a pipelined instruction execution system including a microstore for storing sequences of microinstruction addresses associated with each macroinstruction, a nanostore for randomly storing unique microinstructions, and an execution unit for executing the microinstructions, a no-op/prefetch apparatus, according to the present invention, prevents a microinstruction address, stored in the microstore, from accessing the nanostore and forces a no-op address into the nanostore when the execution unit executes a conditional microbranch instruction. A no-op microinstruction, corresponding to the no-op address, is retrieved from the nanostore and is executed in the execution unit. During the execution of the no-op microinstruction in the execution unit, the no-op/prefetch apparatus permits either the next sequential microinstruction address following the conditional microbranch instruction to access the nanostore or another non-sequential microinstruction address to access the nanostore, the selection of the next sequential microinstruction address or said another non-sequential microinstruction depending upon the outcome of the execution of the conditional microbranch instruction by the execution unit. As a result, when the microstore and the nanostore are utilized, only one cycle of delay, for resolution of the pipeline, will be encountered following the execution of the conditional branch microinstruction by the execution unit. Furthermore, additional real estate is available on the integrated circuit chip on which the instruction execution system is disposed.

6 Claims, 6 Drawing Figures

METHOD AND APPARATUS FOR AVOIDING EXCESSIVE DELAY IN A PIPELINED PROCESSOR DURING THE EXECUTION OF A MICROBRANCH INSTRUCTION

BACKGROUND OF THE INVENTION

1. Field of the Invention

The present invention relates to computer systems, and more particularly, to a pipelined processor capable of executing a two-way conditional branch microinstruction with a single cycle of delay in addition to the execution of the microbranch itself, the additional delay cycle being required for changing direction of the pipeline.

2. Description of the Prior Art

A macroinstruction stored in a main memory comprises a plurality of microinstructions. When the macroinstruction is executed, each of the microinstructions are executed in sequence. Execution of the macroinstruction is complete when the last of the plurality of microinstructions is executed. When the main memory is addressed, the macroinstruction is retrieved and decoded into a starting microinstruction address in an instruction decode unit. The plurality of microinstructions are usually stored in a Read Only Memory (ROM), connected to the instruction decode unit, in the form of microcode. The retrieval of the macroinstruction from main memory necessarily requires the retrieval of the microinstructions from the ROM in response thereto, the microinstructions being executed, in sequence, by an Arithmetic Logic Unit (ALU).

As a result of the introduction of large scale integrated circuitry, circuits are embodied on integrated circuit chips. As technology advances, more and more circuits are required to be embodied on these integrated circuit chips. These circuits require implementation-space (otherwise referred to as "real estate") on the chips, but the available space on these chips is limited. Therefore, as the number of circuits, required to be embodied on the integrated circuit chips, increases, the available space, or, "real estate", on the chips becomes increasingly more scarce.

Due to the need for more space on the integrated circuit chips, it is necessary, in many cases, to reduce the size of the ROM for storage of the microinstructions. In order to reduce the size of the ROM, the ROM is subdivided into two parts: a microstore and a nanostore.

The subdivision of the ROM into the two parts solves one problem, the need for available "real estate" on a chip. However, it creates another problem, namely, an extra cycle of delay is introduced when the ALU executes a microbranch instruction.

A microbranch instruction is one which will branch to one of two directions depending upon the result of a decision. For example, in the quotient A/B, if B is not equal to 0, the quotient must be determined by one method, whereas, if B=0, the quotient must be determined by another method.

In a deeply pipelined processor, if the ROM is used to store the microinstructions, one cycle of delay is encountered when a microbranch instruction is being executed by the ALU, and the ALU branches to the "other method" for a solution to the current decision. However, if the microstore and the nanostore, collectively, store the microinstructions, in lieu of the ROM, two cycles of delay are encountered when the microbranch instruction is being executed by the ALU, and the ALU branches to the "other method" for a solution to the current decision.

As a result, in order to provide more available "real estate" on the integrated circuit chips, a performance sacrifice is necessary.

SUMMARY OF THE INVENTION

It is a primary object of the present invention to provide more available "real estate" on an integrated circuit chip without detrimentally affecting the performance of the circuits on the chip.

It is a further object of the present invention to provide more available "real estate" on an integrated circuit chip by reducing the size of a microinstruction storage means on the chip without also detrimentally affecting the performance of the circuits on the chip by increasing the number of delay cycles which are encountered when a processor on the chip executes a microbranch instruction.

These and other objects of the present invention are accomplished by utilizing a no-op/prefetch apparatus in a microstore-nanostore-ALU pipeline for forcing a no-op instruction in the instruction stream being executed by the pipeline when a microbranch instruction is being executed by the ALU of the pipeline, the no-op instruction representing the first cycle of delay following execution of the microbranch instruction, and for prefetching two branch options for execution following the first cycle of delay, the branch option to be executed being dependant upon the branch decision made as a result of execution of the microbranch instruction.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DETAILED DESCRIPTION OF THE PREFERRED EMBODIMENT

Figure 1:
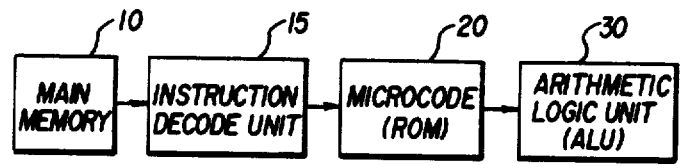
FIG. 1 illustrates a block diagram of a typical pipelined macroinstruction execution system.

Referring to FIG. 1, a macroinstruction execution system is illustrated. In FIG. 1, macroinstructions are stored in a main memory 10. When the main memory is addressed, a instruction is retrieved therefrom and decoded in an macroinstruction decode unit 15. The instruction decode unit 15 accesses a Read Only Memory (ROM) 20, which stores a plurality of microcode. The macroinstruction retrieves a set of microinstructions from the ROM 20, the microinstructions being executed, in sequence, in an Arithmetic Logic Unit (ALU) 30.

The macroinstruction execution system of FIG. 1 is implemented on an integrated circuit chip. In many applications, in order to provide additional implementation space, or "real estate", on the chip, it is necessary to reduce the size of the components of FIG. 1 on the chip. In order to reduce the size of the ROM 20 on the chip, the ROM is replaced with two other smaller components, the size of these smaller components being designed to increase the available "real estate" on the integrated circuit chip.

Figure 2:
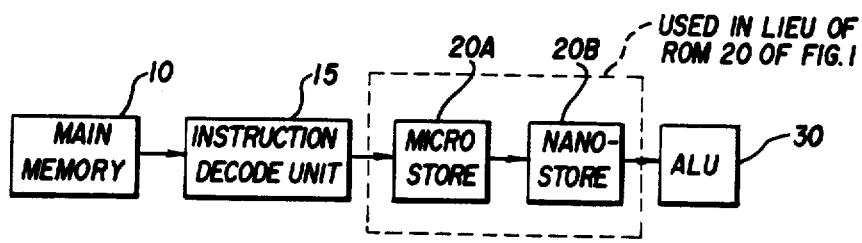
FIG. 2 illustrates a block diagram of another pipelined macroinstruction execution system, this system possessing a modified microinstruction storage means designed to minimize the available "real estate" on an integrated circuit chip.

In FIG. 2, another macroinstruction execution system is illustrated, this system including the two other smaller components which replace the ROM 20 of FIG. 1. In FIG. 2, a microstore 20a, one smaller component, is connected to a nanostore 20b, the other smaller component. Therefore, the macroinstruction execution system of FIG. 2 includes a main memory 10 connected to an instruction decode unit 15, the instruction decode unit 15 being connected to a microstore 20a, the microstore 20a being connected to nanostore 20b, the nanostore 20b being connected to the ALU 30.

The functional operation of the macroinstruction execution system of FIG. 2 will be described in the following paragraph.

The main memory 10 is addressed. In response, main memory 10 develops output signals representing a macroinstruction. The macroinstruction is decoded in the instruction decode unit 15 and accesses microstore 20a. Microstore 20a contains one or a plurality of microinstruction addresses corresponding to each macroinstruction; these are to be applied to the nanostore 20b in sequential order; that is, it functions as an addressing means for addressing the nanostore 20b. In response to an access by the macroinstruction from the main memory 10, the microstore 20a provides a sequence of microinstruction addresses to the nanostore 20b. In response to the addressing performed by the microstore 20a, the nanostore 20b develops output signals representing the set of microinstructions corresponding to the macroinstruction retrieved from main memory 10. The set of microinstructions are executed by the ALU 30.

The macroinstruction execution systems of FIGS. 1 and 2 are pipelined systems. The concept of pipelining will be described in the following paragraph with reference to FIGS. 1 and 2.

In FIG. 1, assuming that each macroinstruction requires only one microinstruction for its execution, while the ALU 30 is executing a microinstruction corresponding to the first macroinstruction, the ROM 20 is being accessed for the microinstruction associated with the second macroinstruction. While the ROM 20 is being accessed for the second microinstruction, the instruction unit 15 is decoding the third macroinstruction and memory 10 is being accessed in preparation for the retrieval of a fourth macroinstruction therefrom. In FIG. 2, while the ALU 30 is executing a microinstruction corresponding to a first macroinstruction, the nanostore 20b is being accessed by the output of the microstore 20a, the nanostore 20b preparing to generate output signals indicative of a microinstruction corresponding to a second macroinstruction. While the nanostore 20b is being accessed, the microstore 20a is being accessed for a microorder indicative of a third macroinstruction.

When there is a set of microinstructions associated with a macroinstruction, as is the normal case, the pipelining is such that ALU 30 is executing the first microinstruction for the said macroinstruction; nanostore 20b is being accessed for the second microinstruction; microstore 20a is being accessed for the address of the third microinstruction and instruction decoder 15 is holding in readiness the macroinstruction which is to be executed subsequent to the said macroinstruction when the set of microinstructions for said macroinstruction have been accessed in full from microstore 20a.

If the instruction being executed by ALU 30 is a set of microinstructions containing a two way conditional branch microinstruction, when execution of the two way conditional branch microinstruction is complete, one of two possible microinstructions will be executed, depending upon the outcome of the execution of the conditional branch microinstruction. If, upon execution of the conditional branch microinstruction, it is decided to execute a first of the two possible microinstructions, the microinstructions in the pipeline are executed in-sequence. The pipeline is undisturbed. However, if, upon execution of the conditional branch microinstruction, it is decided to execute a second of the two possible microinstructions, the microinstructions in the pipeline are executed out-of-sequence. The pipeline is disrupted.

If, in a deeply pipelined processor, it is decided to execute the second of the two possible microinstructions and the microinstructions in the pipeline are executed out-of-sequence, in the FIG. 1 system, one cycle of delay will be encountered between completion of execution of the conditional branch microinstruction by ALU 30 and the execution of the second of the two possible microinstructions by ALU 30. However, in the FIG. 2 system, two cycles of delay will be encountered between completion of execution of the conditional branch microinstruction by ALU 30 and the execution of the second of the two possible microinstructions by ALU 30. The FIG. 1 system produces one cycle of delay due to the presence of ROM 20, whereas the FIG. 2 system produces two cycles of delay due to the presence of microstore 20a and nanostore 20b, since a microbranch decision at ALU 30 must be reflected back to microstore 20a.

Consequently, by utilizing the macroinstruction execution system of FIG. 2, more "real estate" is provided on the integrated circuit chip; however, since the number of cycles of delay has increased, the performance of the FIG. 2 system, vis-a-vis the FIG. 1 system, is detrimentally affected. This phenomenon, relating to the performance degradation of the FIG. 2 system vis-a-vis the FIG. 1 system, will be more fully described with reference to the following paragraphs in association with FIGS. 3 through 5 of the drawings.

Figure 3:
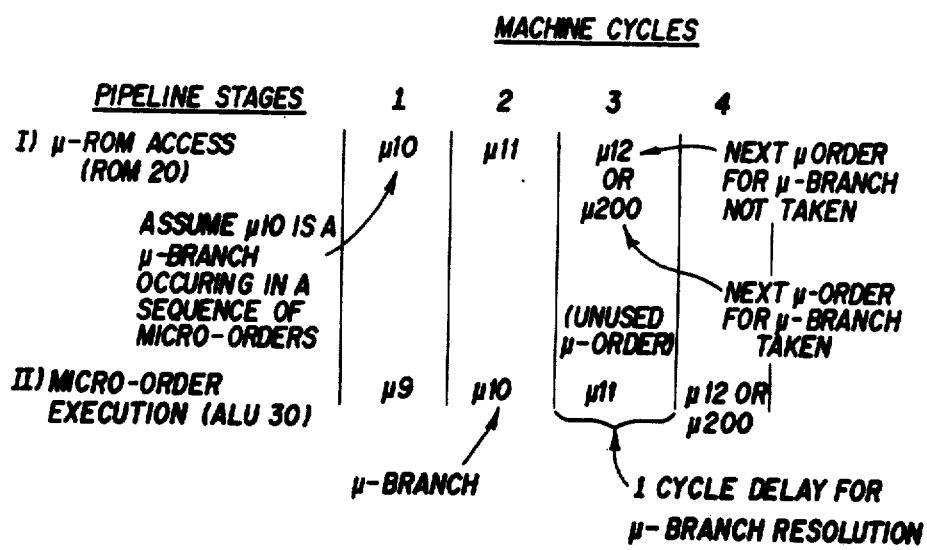
FIG. 3 illustrates the pipeline stages of the macroinstruction execution system of FIG. 1.

Referring to FIG. 3, the pipeline stages associated with the macroinstruction execution system of FIG. 1 is illustrated. This system exhibits one cycle of delay; however, available "real estate" is limited on the integrated circuit chip on which the FIG. 1 system is disposed. In FIG. 3, the pipeline stages include information relating to the instructions being executed in ROM 20 and ALU 30 during machine cycles 1, 2, 3, and 4. For example, microinstruction 10 and microinstruction 9 are associated with ROM 20 and ALU 30, respectively, during machine cycle 1. Assume that microinstruction 10 is a conditional branch microinstruction. During machine cycle 2, ALU 30 is executing conditional branch microinstruction 10. Microinstruction 11 is associated with ROM 20 during this time. During machine cycle 3, microinstruction 11 is being executed by ALU 30. Microinstruction 11 is basically an unused or filler microorder to continue the operation of the pipeline since the results of the microbranch have not yet reached the ALU 30. However, either microinstruction 200 or microinstruction 12 is associated with ROM 20, at this time. One of microinstructions 200 or 12 will be executed during machine cycle 4 depending upon the outcome of the execution of microinstruction 10 during machine cycle 2. One cycle of delay at ALU 30 is experienced during machine cycle 3 between completion of execution of the conditional branch microinstruction 10 by ALU 30 during machine cycle 2 and the commencement of execution of either microinstruction 12 or microinstruction 200 by ALU 30 during machine cycle 4.

Figure 4:
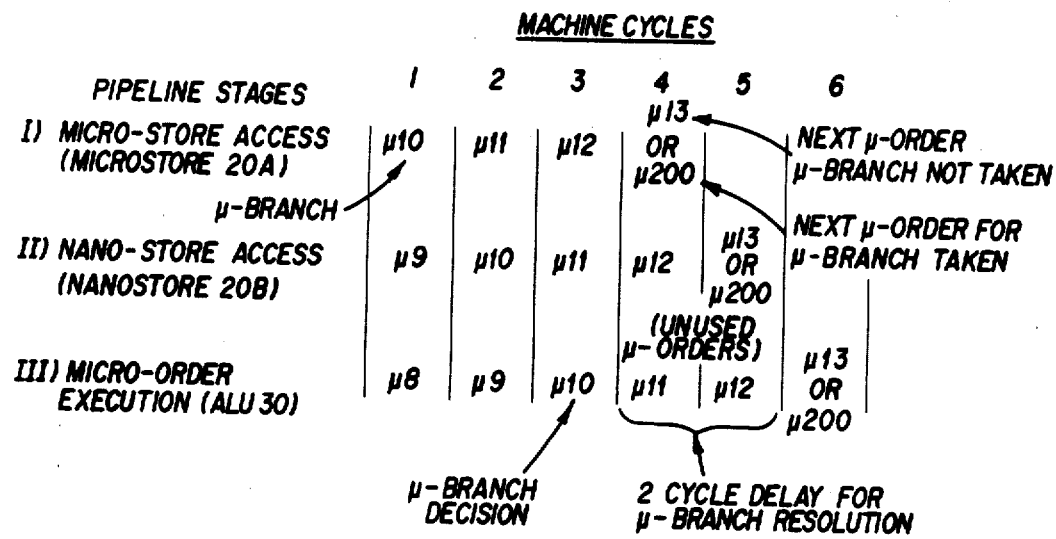
FIG. 4 illustrates the pipeline stages of the macroinstruction execution system of FIG. 2 which does not utilize the no-op/prefetch apparatus according to the present invention.

Referring to FIG. 4, the pipeline stages of the macroinstruction execution system of FIG. 2 is illustrated. This system exhibits two cycles of delay; however, additional "real estate" is available, relative to the system of FIG. 1, on the integrated circuit chip on which the FIG. 2 system is disposed. In FIG. 4, the pipeline stages include information relating to the microinstructions being executed by the microstore 20a, the nanostore 20b, and the ALU 30 during machine cycles 1 through 6. During machine cycle 1, microinstructions 8, 9, and 10 are associated with the ALU 30, nanostore 20b, and microstore 20a, respectively. Assume that microinstruction 10 is the conditional branch microinstruction. During machine cycle 2, microinstructions 9, 10, and 11 are associated with the ALU 30, nanostore 20b, and microstore 20a, respectively. During machine cycle 3, microinstructions 10, 11, and 12 are associated with the ALU 30, nanostore 20b, and microstore 20a, respectively. Since microinstruction 10 is the conditional branch microinstruction, ALU 30 will, during machine cycle 3, decide whether the microinstruction to be associated with microstore 20a during machine cycle 4 will be microinstruction 13 or microinstruction 200. At ALU 30, machine cycles 4 and 5 are delay cycles; that is, these unused cycles must elapse before either microinstruction 13 or microinstruction 200 is executed by the ALU 30 during machine cycle 6. Notice that cycles 4 and 5 represent two cycles of delay. During machine cycle 4, microinstructions 13 or 200 are associated with microstore 20a. During machine cycle 5, microinstructions 13 or 200 are associated with nanostore 20b.

Figure 5:
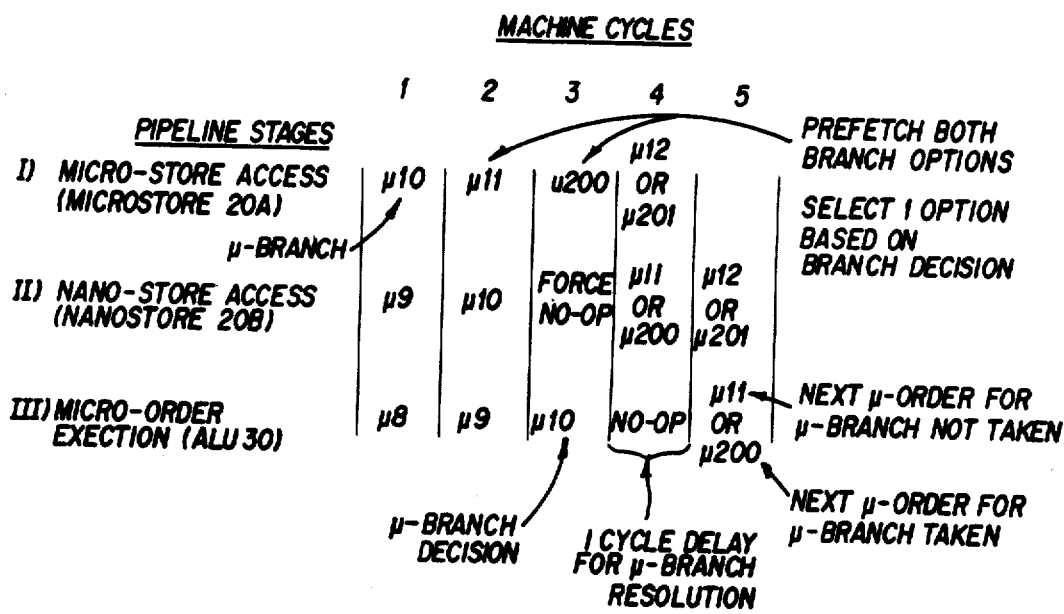
FIG. 5 illustrates the pipeline stages of the macroinstruction execution system of FIG. 2 which utilizes the no-op/prefetch apparatus according to the present invention.

Referring to FIG. 5, the pipeline stages of the macroinstruction execution system of FIG. 2, utilizing the no-op/prefetch apparatus according to the present invention, is illustrated. This system exhibits only one cycle of delay. Furthermore, additional "real estate" is still available, relative to the system of FIG. 1, on the integrated circuit chip on which the FIG. 2 system is disposed. In FIG. 5, the pipeline stages include information relating to the instructions being executed by the microstore 20a, the nanostore 20b, and the ALU 30 during machine cycles 1 through 5. During machine cycle 1, microinstructions 8, 9, and 10 are associated with ALU 30, nanostore 20b, and microstore 20a, respectively. Assume microinstruction 10 is the conditional microbranch instruction. During machine cycle 2, microinstructions 9, 10, and 11 are associated with ALU 30, nanostore 20b, and microstore 20a, respectively. During machine cycle 3, conditional branch microinstruction 10 is being executed by ALU 30. Instead of allowing microinstruction 11 to associate with nanostore 20b during machine cycle 3, a no-op instruction is forced into the pipeline associated with nanostore 20b. Microinstruction 11 remains associated with microstore 20a; however, in addition, there is a prefetch of microinstruction 200; it is associated with microstore 20a along with microinstruction 11. Therefore, both microinstruction options, 11 and 200, are associated with microstore 20a. During machine cycle 4, the ALU 30 is idle, the no-op microinstruction being associated therewith. The microbranch has been resolved and either microinstruction option 11 or 200, depending upon the resolution of the microbranch, is chosen to be associated with nanostore 20b, and, likewise, either microinstruction option 12 or 201 is associated with microstore 20a. During machine cycle 5, ALU 30 will execute either microinstruction 11 or microinstruction 200 depending upon the outcome of the execution of the conditional branch microinstruction 10 by ALU 30 during machine cycle 3. If ALU 30 executes microinstruction 200, microinstruction 201 is associated with nanostore 20b in cycle 5. If ALU 30 executes microinstruction 11, microinstruction 12 is associated with nanostore 20b in cycle 5.

Figure 6:
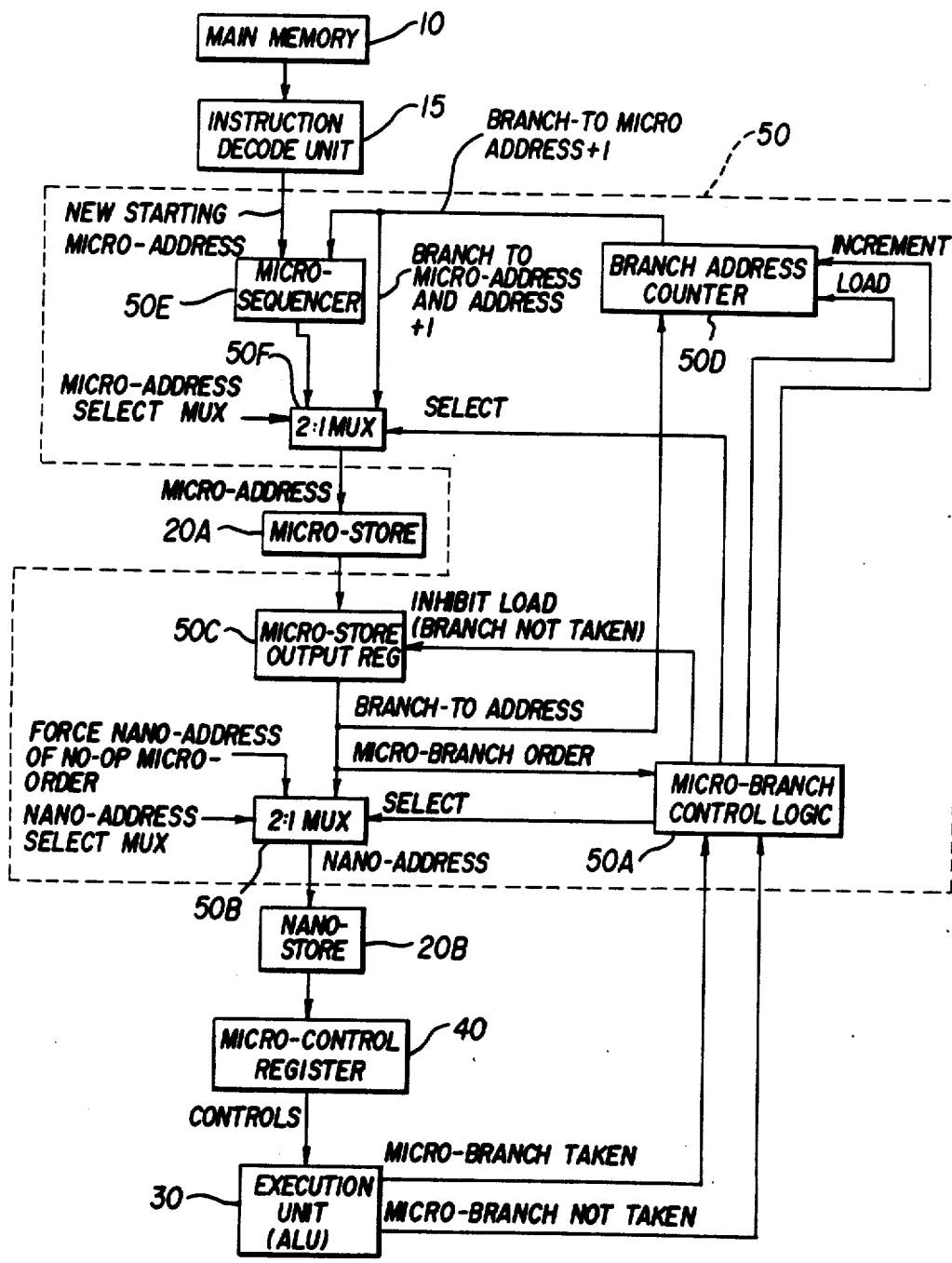
FIG. 6 illustrates a microstore-nanostore-ALU pipeline including the no-op/prefetch apparatus according to the present invention.

Referring to FIG. 6, a microstore-nanostore-ALU pipeline is illustrated, which includes the no-op/prefetch apparatus according to the present invention.

In FIG. 6, a main memory 10 is connected to the instruction decode unit 15 which is further connected to the microstore 20a by way of a portion of a no-op/prefetch apparatus 50 according to the present invention. The microstore 20a is connected to the nanostore 20b by way of another portion of the no-op/prefetch apparatus 50. The nanostore 20b is connected to an execution unit (or ALU) 30 via a microcontrol register 40.

The no-op/prefetch apparatus 50 comprises a microbranch control logic 50a. The logic 50a receives a MICROBRANCH TAKEN signal and a MICROBRANCH NOT TAKEN signal from the ALU 30. The microbranch control logic 50a is connected to a multiplexer (MUX) 50b via a SELECT line. The MUX 50b is connected, at its output, to the nanostore 20b. One input of the MUX 50b receives an address of the no-op instruction. The other input of MUX 50b is connected to an output of a microstore output register 50c. The signal on the SELECT line from logic 50a selects either the one input or the other input of MUX 50b for connection to the MUX 50b output terminal. An input of the microstore output register 50c is connected to microstore 20a. An output from the microstore output register 50c is connected to microbranch control logic 50a via a MICROBRANCH ORDER line. The microbranch control logic 50a is connected to the microstore output register 50c via an INHIBIT LOAD (BRANCH NOT TAKEN) line. Further, the microbranch control logic 50a is connected to a branch address counter 50d via a LOAD line and an INCREMENT line. An output from the microstore output register 50c is also connected to the branch address counter 50d via BRANCH TO ADDRESS lines. The branch address counter 50d is connected to the second input terminal of a microsequencer 50e and to the second input terminal of another multiplexer (MUX) 50f. The first input terminal of the microsequencer 50e is connected to instruction decode unit 15 via a NEW STARTING MICRO-ADDRESS line. The output of microsequencer 50e is connected to the first input terminal of MUX 50f. The microbranch control logic 50a is connected to MUX 50f via a SELECT line, the signal on the SELECT line of MUX 50f selecting either the output of microsequencer 50e or the output of the branch address counter 50d for connection to the output terminal of MUX 50f. The output terminal of MUX 50f is connected to an input of microstore 20a.

A functional description of the operation of the no-op/prefetch apparatus according to the present invention in association with the microstore-nanostore-ALU pipeline will be set forth in the following paragraphs with reference to FIGS. 5 and 6 of the drawings.

In FIG. 6, during machine cycle 2, the execution unit (ALU) 30 is executing microinstruction 9 in a set of microinstructions associated with a given macroinstruction. Therefore, microinstruction 9 is stored in microcontrol register 40. Conditional branch microinstruction 10 is stored in the microstore output register 50c. Microinstruction 11 is stored in the microsequencer 50e. Recall that, depending upon the outcome of execution of the conditional branch microinstruction 10, either microinstruction 11 or microinstruction 200 will be executed by the ALU during machine cycle 5. During machine cycle 1, microinstruction 10 was accessed from microstore 20a and stored in microstore output register 50c at the beginning of machine cycle 2. During machine cycle 2, microinstruction 10 informs microbranch control logic 50a that it is a conditional branch microorder via the MICROBRANCH ORDER line connecting register 50c with logic 50a. In addition, during machine cycle 2, the alternate microprogram address 200 for the microbranch, which was defined as part of microinstruction 10, is transferred from register 50c to branch address counter 50d in parallel via the BRANCH-TO-ADDRESS lines. Also, during machine cycle 2, since MUX 50b is set to select its first input terminal, microinstruction 10, in microstore output register 50c, addresses nanostore 20b thereby selecting a microinstruction associated therewith. During machine cycle 3, microinstruction 10, the microbranch, is executed by the ALU 30. During this machine cycle, when execution of microinstruction 10 commences, microinstruction 11 is stored in the microstore output register 50c. However, the microbranch control logic 50a selects, via the SELECT line, the second input terminal of MUX 50b. Therefore, microinstruction 11 does not address the nanostore 20b; rather, an address of the no-op instruction addresses the nanostore 20b via the second input terminal of the MUX 50b. Microinstruction 11 remains stored in the microstore output register 50c. At the same point in time, the branch address counter 50d, having been loaded with the address of microinstruction 200 during cycle 2, is selected as the second input terminal of MUX 50f. Therefore, the address of microinstruction 200 is sent to microstore 20a via the second input terminal of MUX 50f.

During machine cycle 4, the no-op instruction is being executed by the ALU 30. Simultaneously with execution of the no-op instruction, if execution of conditional branch microinstruction 10 indicates that a microbranch should be taken to microinstruction 200, the signal on the INHIBIT LOAD line from the microbranch control logic 50a is low thereby allowing the address of microinstruction 200 to overlay or overwrite the address of microinstruction 11 stored in the microstore output register 50c. Therefore, during the execution of the no-op instruction, the nanoaddress associated with microinstruction 200 addresses nanostore 20b, via MUX 50b, retrieving therefrom a microinstruction which is executed by the execution unit (ALU) 30 during machine cycle 5. At the same point in time, during cycle 4, address 200 is incremented to 201 in branch address counter 50d and is passed, as the second input, to the microsequencer 50e, thus replacing the microinstruction 12 address. The function of microbranch control logic 50a and branch address counter 50d is thus completed and the operation continues normally as microsequencer 50e continues to increment address 201 each machine cycle.

However, if execution of conditional branch microinstruction 10 indicates that a microbranch should not be taken to microinstruction 200, the signal on the INHIBIT LOAD line from the microbranch control logic 50a is high thereby preventing the nanoaddress of microinstruction 200 from overlaying or overwriting the address of microinstruction 11 stored in the microstore output register 50c. Therefore, during the execution of the no-op instruction in cycle 4, the nanoaddress associated with microinstruction 11 addresses nanostore 20b, via MUX 50b, retrieving therefrom a microinstruction which is executed by the execution unit (ALU) 30 during machine cycle 5. At the same time, during cycle 4, microinstruction address 12, being held in microsequencer 50e, remains unchanged (is not overwritten with address 201) and is applied to the microstore 20a. Operation continues in normal fashion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A pipelined instruction execution system, comprising:

first store means for storing sets of sequential addresses;

second store means connected to said first store means for storing a plurality of microinstructions and a no-op microinstruction, each microinstruction corresponding to an address stored in said first store means;

execution means connected to the second store means for executing a set of microinstructions stored in said second store means in a sequential fashion in accordance with the addresses stored in said first store means and for executing said no-op microinstruction; and first means interconnected between the first and second store means for preventing a microinstruction address from said first store means from accessing said second store means for the purpose of searching for a microinstruction stored therein and for accessing said second store means with an address indicative of said no-op microinstruction when said execution means is executing a conditional branch microinstruction.

2. The pipelined instruction execution system of claim 1, wherein said first means permits either a first microinstruction address or a second microinstruction address to access said second store means during the execution of said no-op microinstruction by said execution means, the selection of said first or second microinstruction address for accessing said second store means depending upon the results of the execution of said conditional branch microinstruction by said execution means, said first microinstruction address representing the next sequential microinstruction following said conditional branch microinstruction, said second microinstruction address representing another non-sequential microinstruction.

3. The pipelined instruction execution system of claim 2, wherein said first means comprises:

control means connected to said execution means for developing a select signal when said execution means is executing said conditional branch microinstruction; and multiplexer means having an output connected to said second store means and responsive to a first signal representing said address indicative of said no-op instruction, to a second signal representing said microinstruction address from said first store means and to said select signal for selecting said first signal in response to said select signal from said control means thereby permitting said execution means to execute said no-op instruction.

4. The pipelined instruction execution system of claim 3, wherein said control means develops an inhibit load signal during the execution of said no-op instruction by said execution means when said results of the execution of said conditional branch microinstruction by said execution means indicated that said second microinstruction address shall access said second store means, said inhibit load signal preventing said first microinstruction address from accessing said seond store means thereby allowing said second microinstruction address to subsequently access said second store means.

5. The pipelined instruction execution system of claim 4, further comprising:

output register means interconnected between said first store means and said multiplexer means and responsive to said inhibit load signal for preventing said first microinstruction address from being loaded therein in response to said inhibit load signal and for allowing said second microinstruction address to be loaded therein in response to the absence of said inhibit load signal thereby allowing said second microinstruction address to subsequently access said second store means.

6. A method of pipelining in a pipelined instruction execution system including a first store means for storing sets of sequential addresses, a second store means connected to the first store means for storing microinstructions corresponding to said addresses and a no-op microinstruction and an execution means connected to the second store means for executing the microinstructions, comprising the steps of:

forcing a no-op microinstruction address corresponding to said no-op microinstruction to access said second store means when said execution means is executing a conditional branch microinstruction; and preventing a first microinstruction address, representing a next sequential microinstruction folowing said conditional branch microinstruction, from accessing said second store means during the execution of said no-op instruction by said execution means when a previous result of the execution of said conditional branch microinstruction indicated that a second microinstruction address, representing another non-sequential microinstruction, should access said second store means.

* * * * *